(No Model.)

M. EPSTEIN.
FILTERING TUBE.

No. 485,788. Patented Nov. 8, 1892.

Witnesses:
Mark M. Decker
J. Straus

Inventor:
Moritz Epstein,
By J. W. Barker
Attorney.

UNITED STATES PATENT OFFICE.

MORITZ EPSTEIN, OF BERLIN, GERMANY.

FILTERING-TUBE.

SPECIFICATION forming part of Letters Patent No. 485,788, dated November 8, 1892.

Application filed January 7, 1892. Serial No. 417,317. (No model.) Patented in Germany May 17, 1891, No. 61,375; in England December 14, 1891, No. 21,826; in France December 16, 1891, No. 218,088, and in Belgium December 17, 1891, No. 97,614.

*To all whom it may concern:*

Be it known that I, MORITZ EPSTEIN, glass-maker, of 28 and 29 Lothringerstrasse, Berlin, in the German Empire, have invented certain new and useful Improvements in Filtering-Tubes with Ball Filtering Material for Purifying Molten Glass, (for which I have received Letters Patent in Germany, No. 61,375, dated May 17, 1891; in England, No. 21,826, dated December 14, 1891; in France, No. 218,088, dated December 16, 1891; in Belgium, No. 97,614, dated December 17, 1891, and in Canada, (not yet granted,) filed December 30, 1891,) of which the following is a full, clear, and exact specification.

My invention relates to an improved filtering-tube with ball-filter for purifying molten glass and attaining a continuous production of purified glass; and it consists of an open melting-pot with melting-vessel provided with serpentine refining-ways and a filtering-tube with ball-filter, reference being made to the accompanying drawings, in which—

Figure 1:
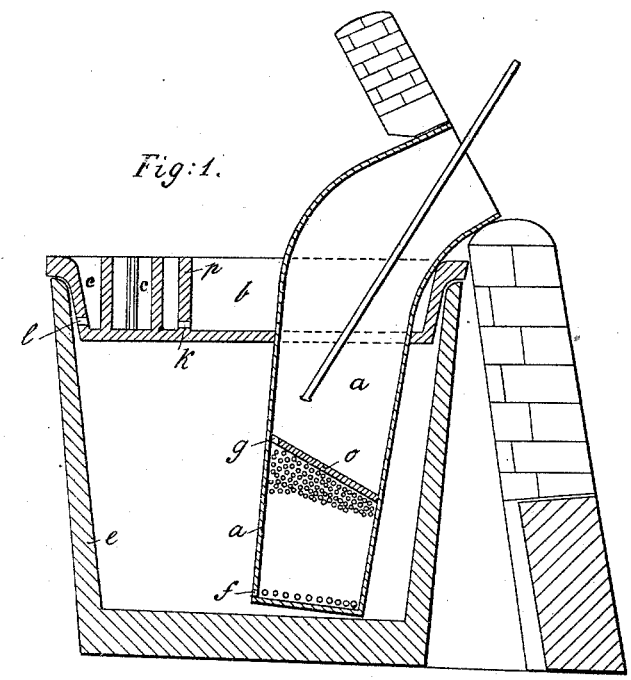
Figure 2:
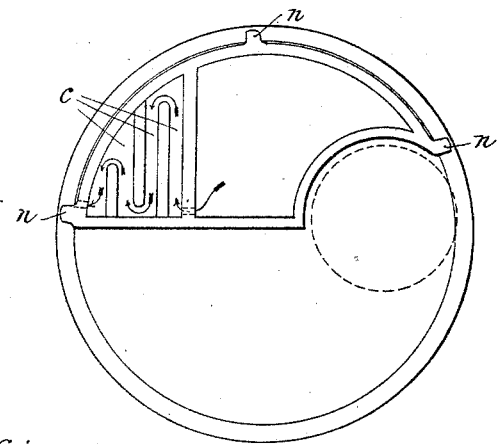

Figure 1 is a vertical section of my improved apparatus; Fig. 2, a top view of the same.

The melting-vessel $b$, which rests with three trunnions $n$ on the upper edge of the melting-pot, is supplied with the material to be melted through a small opening near the working hole. This material melts and penetrates, through the opening $k$ in the partition $p$, into the refining-space $c$, passes through the same in serpentine way, and flows, refined, through the opening $l$ into the pot. This glass penetrates through the openings $f$ into the filtering-tube $a$, from whence it can be taken as required.

The molten glass must first pass through the filtering-chamber with its clay balls, which are lighter than glass and swim in the same, and then through a perforation $g$ in the cover $o$ to the filtering-chamber of the tube $a$ into the tube itself. The glass becomes here cooler, as it is entirely excluded from the direct action of the fire, and can be taken from the same to be further operated on. The ball-filter will allow none of the impurities which were present in the glass to penetrate into the upper part of the tube above the cover or partition $o$. As soon as the level of the surface of the molten-glass mass in the pot $e$ sinks fresh material is charged into the melting-vessel $b$, so that a continuous working can be carried out. Such work has hitherto been effected by the melting-pots being three times charged before the same were filled, which, according to the size of the same, consumed fourteen to twenty hours before the glass was molten and ready for use, whereas by employing my improved apparatus continuous and uninterrupted working can be effected and the pauses hitherto necessary for melting the glass entirely avoided. Up to now it was impossible, even under the most favorable circumstances, to work a furnace more than twenty-four times a month, each time ten hours, making a total of two hundred and forty hours a month, whereas by using my invention seven hundred working-hours can be attained. The consumption of fuel is also considerably less, as it is no longer necessary to cool the furnace before commencing work, as formerly, nor does it take several hours' heat before charging with fresh material. When this invention is employed, the furnace continuously retains the same heat and is not cooled, as the glass in the filtering-tube is so cooled that it can be used direct. In consequence of the furnace and the melting-vessels being continuously subjected to a uniform heat it will be evident to all versed in the art that they are very considerably less subjected to wear and tear. I consequently attain by using my invention the same result with the ordinary open pots as in a cuvette oven, without the great expense of the erection of the same.

What I claim as my invention, and desire to secure by Letters Patent, is—

1. An improved device for refining molten glass, consisting of a filtering-tube $a$, divided into two or more compartments, the lower of which is filled with clay or porcelain balls, so that the glass after having passed the openings $f$ at or near the bottom of said lower compartment must pass through the clay or porcelain balls before it can enter the upper compartment through the orifice $g$ in the partition $o$, substantially as shown and described.

2. An improved device for refining molten glass, consisting of a filtering-tube divided into two or more compartments, the lower of which is filled with clay or porcelain balls, so that the glass after having passed the openings $f$ at or near the bottom of said lower compartment must pass through the clay or porcelain balls before it can enter the upper compartment through the orifice $g$ in the partition $o$, together with a melting-vessel $b$, supported by the melting-pot, said vessel having a partition $p$ and an opening $k$ at or near the bottom of said partition for allowing the material to penetrate into the refining-space $c$, whence it passes in serpentine way and flows through an opening $l$ in the side or wall of said melting-vessel into the melting-pot, substantially as shown and described.

In witness whereof I have hereunto signed my name in the presence of two subscribing witnesses.

MORITZ EPSTEIN.

Witnesses:
WILHELM VOGT,
FRANZ KOLLM.